W. A. BRYANT.
Apparatus for Detaching Horses from Vehicles.
No. 202,223. Patented April 9, 1878.
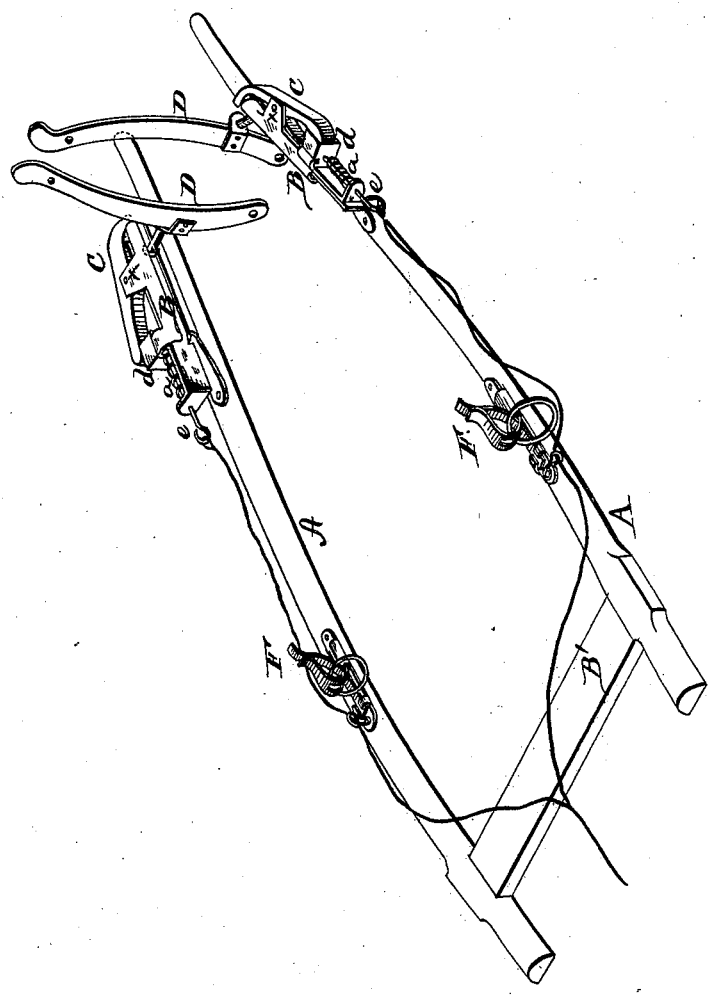
WITNESSES
INVENTOR
William A. Bryant
Alexander Mason
ATTORNEYS

UNITED STATES PATENT OFFICE.

WILLIAM A. BRYANT, OF NOTASULGA, ALABAMA.

IMPROVEMENT IN APPARATUS FOR DETACHING HORSES FROM VEHICLES.

Specification forming part of Letters Patent No. 202,223, dated April 9, 1878; application filed January 16, 1878.

To all whom it may concern:

Be it known that I, WILLIAM A. BRYANT, of Notasulga, in the county of Macon, and in the State of Alabama, have invented certain new and useful Improvements in Mode of Attaching and Detaching Horses; and do hereby declare that the following is a full, clear, and exact description thereof, reference being had to the accompanying drawings, and to the letters of reference marked thereon, making a part of this specification.

The nature of my invention consists in the construction and arrangement of a device to be connected to the shafts of vehicles, whereby horses may be readily attached to and detached from them, as will be hereinafter more fully set forth.

To enable those skilled in the art to make and use my invention, I will proceed to describe its construction and operation.

In the accompanying drawing, which is a perspective, and which is a part of this specification, A A represent the shafts of a vehicle, and B the cross-bar between them.

Near the forward ends of the shafts, and secured firmly upon them, are the metal box-frames B B. The inner sides of these frames are provided with either a V-shaped or a T-shaped groove. The object of these grooves I will now explain. Upon the hames D D of a set of harness I secure a metal plate, having a rod forming a part of it, which has either a beveled or a square-shaped head. This head passes into the T-shaped groove from its forward end, and is there retained, being allowed to slide backward and forward, as circumstances may require. The head is retained in the groove by a lever, C, upon each box. These levers C C are pivoted between two ears, x, on the outer sides of the boxes B B, and their forward ends are curved around, so that when in one certain position, these ends stop the ends of the grooves in the boxes and prevent the heads of the hame-pins from passing out.

d d represent two blocks, which pass between the boxes and the rear ends of the levers C, to hold said levers securely in one place after the heads have been caught in the grooves. These blocks are connected to the pins e e, and the pins are surrounded with coiled-wire springs a a. The pins pass back through wings or flanges at the rear ends of the boxes. The springs have a forward tendency, and keep the blocks pressed under the ends of the levers.

To the rear ends of the pins e e are connected cords, which pass back to the dash-board of the vehicle and in easy reach of the driver. By pulling the cord sharply the blocks are drawn back, the rear ends of the levers are released, and their forward ends immediately move outward, so as to uncover the ends of the grooves, and thus allow the heads of the rods of the hames to pass out. As the breeching-rings are retained in the spring-jaws F F, and as these jaws open forward, the horse readily moves out of the shafts, being thus disengaged from the wagon. By this arrangement it will be seen that I dispense with the use of traces, making the shafts perform their functions of drawing the vehicle.

A horse is by this plan much more easily attached to a vehicle, and in case of a runaway or any serious accident is instantly released, so that he can do no damage.

Having thus fully described my invention, what I claim as new, and desire to secure by Letters Patent, is—

1. The box-frame B B, with its T-shaped groove, in combination with the headed rods upon the hames D D, as and for the purpose set forth.

2. The levers C C and the blocks d d, with their spring and cord attachment, in combination with the frames B B, provided with the groove, as and for the purpose set forth.

3. In combination with the boxes B B, as constructed with their grooves and levers, the spring-jaws F F for freeing the breeching-rings, substantially as herein set forth.

In testimony that I claim the foregoing I have hereunto set my hand this 11th day of December, 1877.

W. A. BRYANT.

Witnesses:
 G. W. HARDY,
 ELLICK BEDELL.